Dec. 10, 1963 C. NEUMILLER 3,114,105

SHOULDER MOUNTED RADIO SPEAKER AND MICROPHONE

Filed Feb. 9, 1962 2 Sheets-Sheet 1

INVENTOR.
CHARLES NEUMILLER
BY [signature]
ATTORNEY

SHOULDER MOUNTED RADIO SPEAKER AND MICROPHONE

Filed Feb. 9, 1962 2 Sheets-Sheet 2

INVENTOR.
CHARLES NEUMILLER
BY [signature]
ATTORNEY

United States Patent Office 3,114,105
Patented Dec. 10, 1963

3,114,105
SHOULDER MOUNTED RADIO SPEAKER AND MICROPHONE

Charles Neumiller, 14205 Arnold Drive, Glen Ellen, Calif.
Filed Feb. 9, 1962, Ser. No. 172,225
9 Claims. (Cl. 325—16)

This invention relates to a combination radio transmitter and receiver for a portable communication system, and more particularly it relates to a combined speaker-microphone-antenna unit for such a system.

In almost all types of industry there has been an ever increasing need for more versatile and efficient person-to-person communication systems, and especially for relatively short range or intra-plant voice communication systems that will enable personnel to be in constant contact with others in remote locations even though they are moving about the plant facilities performing other tasks and are often in areas having a high noise level.

Basically, all person-to-person communication systems such as a two-way radio system or even a simple telephone system must include an acoustic transducer or a microphone to pick up and send a spoken message and a loudspeaker device or its equivalent for receiving and directing the sound of the other person's voice to the speaker's ears. Prior to the present invention, all such communication systems including those particularly intended for industrial purposes had either one or two or both of the following disadvantages. First, they required that either the sender or the receiver or both, utilize his hands to manipulate the microphone or speaker unit in order to locate it in the proper position relative to his mouth or ear; or, on the other hand, all such prior art portable voice communication systems required that either the loud speaker or microphone components or both of them be attached to some portion of the person's head.

One principal object of the present invention is to provide an improved device for a person-to-person voice communication system that eliminates the necessity for both of the aforementioned conditions. More specifically, it is an object of my invention to provide an improved radio receiver and transmitter device adapted to be carried by mobile personnel that will leave each person using the unit with his hands free to perform other tasks and with his head unencumbered by any apparatus that can cause a hindrance to his operating efficiency, or which can cause any physical or mental irritation, and/or fatigue. These are extremely important factors affecting the operation and efficiency of various industrial communication systems where the personnel sending or receiving the communications are constantly moving about and are required to perform many tasks using their hands under circumstances where their head must be able to move often and rapidly without limitation.

Another object of my invention is to provide a radio receiver and transmitter device having a combined speaker-microphone-component secured in a unique housing that can be conveniently attached to a person on his shoulder and when attached will remain in a fixed stable position thereon. The housing serves to retain the microphone-speaker in just the right position on the wearer's shoulder so that it is easily accessible to his ear and to his mouth when his head is turned slightly. Also, due to its novel shape the housing is stabilized when attached so that it will remain in its proper position even though the wearer is actively moving about.

It is also an object of the invention to provide a speaker-microphone-antenna unit that can be easily attached to and removed from a person's shoulder, and which can be worn with equal effectiveness by persons of different size.

Still another object of my invention is to provide a combination speaker-microphone-antenna unit having an extremely light weight. This factor is important because it eliminates any problem of fatigue when the unit is worn for longer periods of time.

The present invention contemplates a portable communication device utilizing my speaker-microphone-antenna unit, combined with a compact transceiver that is easily attachable to the belt of the person wearing the device. Although weighing somewhat more than the speaker-microphone-antenna, the transceiver unit can be readily supported on the body of the person without causing any interefrence in his activities.

Another object of the invention is to provide a portable radio transmitter and receiver device including a speaker-microphone-antenna unit which is especially adaptable for ease and economy of manufacture.

Other objects, advantages, and features of my invention will be obvious from the following description of a preferred embodiment thereof, presented in accordance with 35 USC 112.

Figures 1, 2, 3:
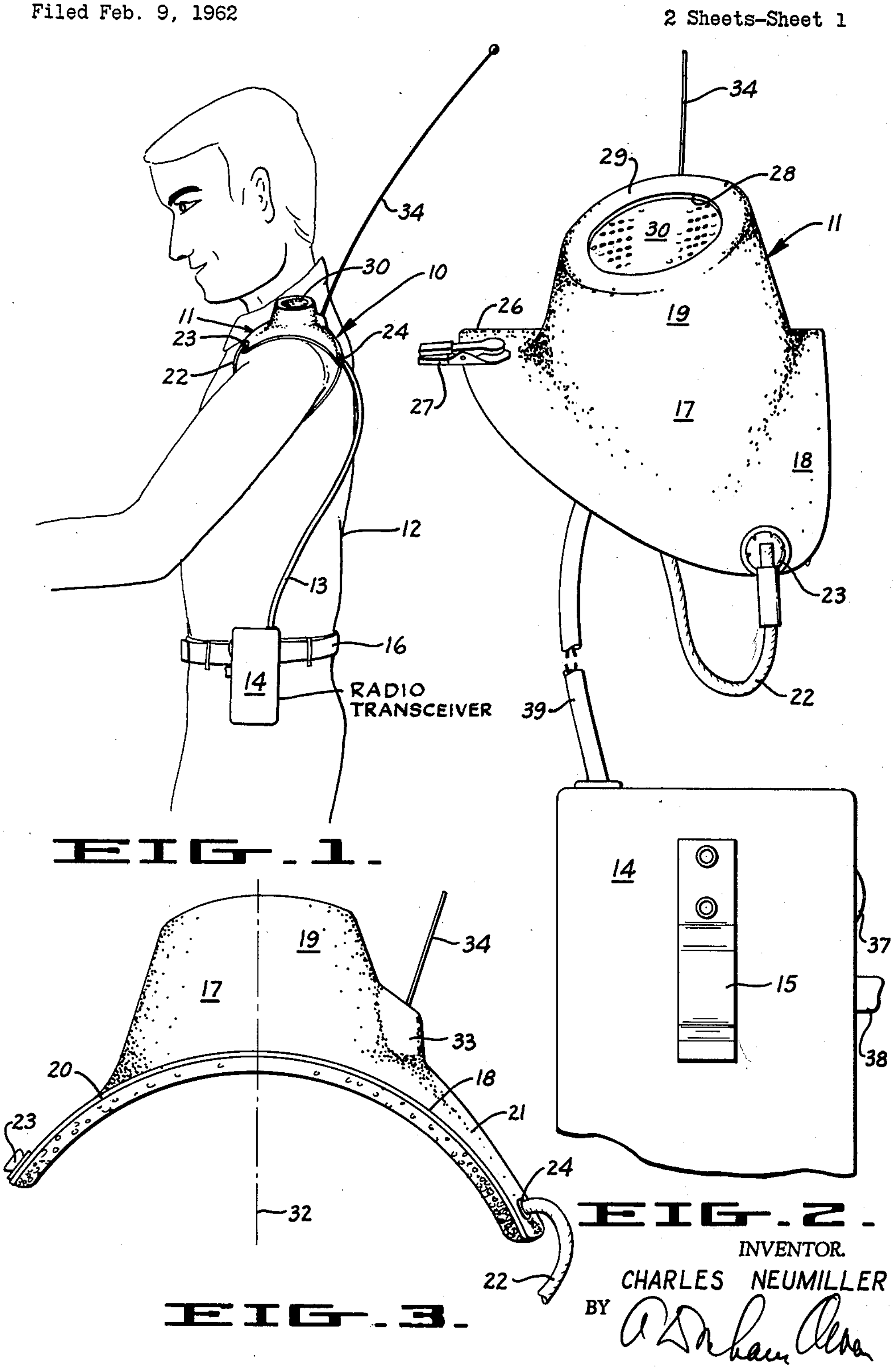
FIG. 1 is a view in perspective showing the speaker-microphone unit in accordance with the principles of the present invention as it appears when in normal use.
FIG. 2 is a view in side elevation showing the speaker-microphone according to the invention attached to the radio receiver-transmitter unit with a portion of the latter broken away to conserve space.
FIG. 3 is a view in end elevation of the speaker-microphone housing shown in FIG. 2.

Referring to the drawings, FIG. 1 shows my portable voice communication device 10 embodying the principles of the invention as it appears in use when properly worn. In operation the device 10 may be utilized to communicate with another person wearing a similar device or it may be used as part of a centralized communication system wherein a direct communication link is maintained between a main transmitting unit and a plurality of personnel each having a device 10.

Broadly speaking, the device 10 comprises a microphone-speaker-antenna unit 11 which is attached to the shoulder of the user designated by the numeral 12. From the unit 11, an electrical conduit 13 extends downward and is attached to a battery powered transistorized radio-transceiver unit 14. The unit 14 may be of any suitable well-known type of transceiver that is commercially available with its components and battery all contained within a compact plastic box. As shown in FIG. 2, a metal clip 15 is riveted to the unit 14 so that it can be conveniently attached to the user's belt 16.

A unique feature of my microphone-speaker-antenna unit 11 is a contoured housing 17 in which various electrical elements of the device 10 are retained. The housing 17, whose features can be discussed more readily with reference to FIGS. 2–5, not only is attractive in appearance, but it also provides several important functions that produce unexpected and advantageous results. For one thing, its novel shape enables it to be attached to the shoulder of a person no matter what his size and in such a manner that it will be secure and stable for extended periods of time. A second feature is that when attached it is automatically oriented relative to the wearer in the most efficient position and at the proper angle so that the sound from the speaker is readily accessible to the wearer's ear, and so that the microphone can efficiently pick up the normal speaking voice of the wearer when his head is turned toward the shoulder unit 11. This can readily be seen by reference to FIG. 1.

Figures 4, 5:
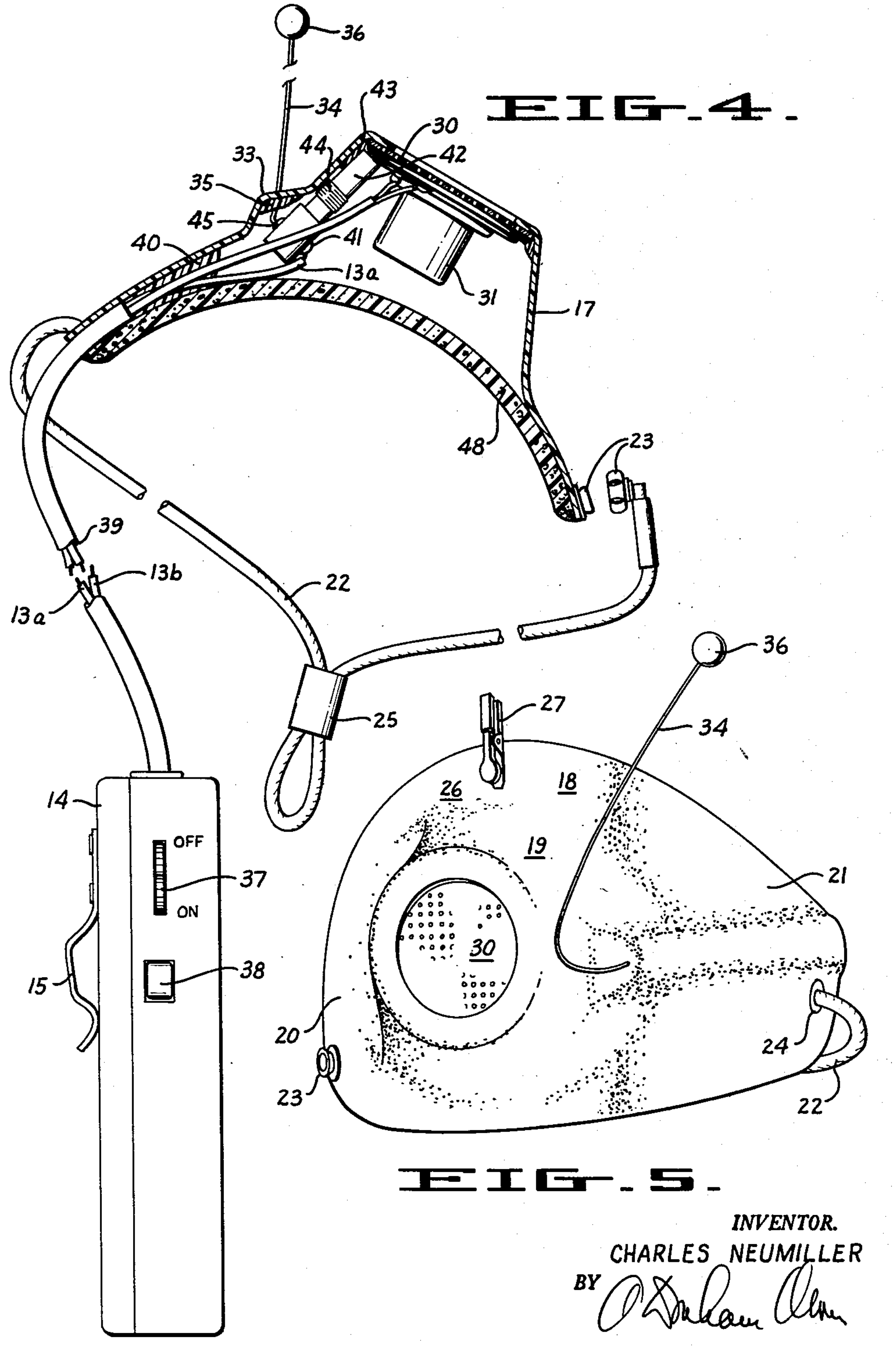
FIG. 4 is an enlarged view in side elevation and in section showing the speaker-microphone housing according to the invention and its various components attached to the radio receiver transmitter.
FIG. 5 is a plan view of the speaker-microphone housing shown in FIG. 2.

The housing 17 is preferably a one piece member made from some suitable plastic material that can be heat-vacuum molded to form the internal contours which enable it to rest easily and to be readily secured in the desired position on any person's shoulder. The FIGS. 2 and 4 illustrate front and side elevation views, respectively, of the housing 17 which comprises generally a contoured base portion 18 and a centrally located protuberance or upwardly projecting portion 19 underneath which is formed a recess for retaining the elements of the microphone-speaker-antenna unit 11. The inner surface base portion 18 is concave in cross section (FIG. 3) around the recess formed by the projecting portion 19, so that with this moderate curvature it will fit over any person's shoulder. On opposite sides of the upwardly projecting portion 19 it forms contoured stabilizing members 20 and 21 that are curved in cross section and are tapered downwardly. At the lower extremity of each stabilizing side member 20 and 21 I prefer to attach an elastic band 22 of some suitable type for use in securing the unit 11 to the wearer. At least one end of the band 22 can be attached to a member 20 of the housing 17 by means of a snap fastener 23 and the other end can be attached permanently to the member 21 by means of a rivet 24 or similar means. A plastic slide member 25 (FIG. 4) attached to the elastic band 22 provides a means for adjusting the tension to suit the wearer.

On a third side of the housing 17 adjacent the central projecting portion 19 and between the stabilizing side members 20 and 21 is an inwardly extending portion 26 of the base portion 18 which is adapted to lie on top of the wearer's shoulder. Connected to this extended portion 26 is a spring-loaded clip 27 for gripping a portion of the wearer's clothing such as his coat collar. Although the clip 27 is not absolutely essential, it can further help in maintaining the microphone-receiver-antenna unit 11 in the desired position on the operator's shoulder.

The upwardly projecting portion 19 has generally a frusto-conical shape with a circular cross section near its upper end. At its top as seen in FIG. 5 is a large circular opening 28 bordered by a circular flanged portion 29 of constant width that retains a perforated metal grill 30 for protecting a speaker-microphone component 31 mounted within the upwardly projecting portion 19. As indicated by the drawings, the plane formed by the circular flange portion 29 of the contoured housing 17 preferably has a slight forward inclination when it is properly positioned on an operator's shoulder. This is indicated in FIG. 3 of the drawings wherein the dotted line 32 represents a bisecting line through the center of curvature of the curved cross section of the housing base portion 18. This line 32 is roughly parallel to the vertical axis of the operator wearing the shoulder mounted unit 11, so it is apparent that a degree of forward tilting is normally obtained when the unit is attached as is indicated in FIG. 1. The upper end of the projection 19 is also preferably tilted inwardly toward the head of the wearer 12 in normal use as seen in FIG. 4 since it extends upward with its central axis tilted inwardly at a fixed angle towards the extended portion 26 on the base housing portion 18 as shown in FIG. 2. The amount of tilt of the axis of the projection 19 in the two directions with respect to a vertical axis as described above can vary, but I have found that approximately 10°–15° is adequate. This tilting of the end of the projection 19 is important because it enables the speaker-microphone-antenna unit 11 to be oriented automatically when attached in exactly the proper position so that the wearer's utterances can be transmitted with a minimum of head movement. Also, the sound coming from the speaker is directed closer to the ear of the wearer.

Rearward of the upwardly projecting housing portion 19 and lower down along its side 21 as shown in FIG. 3 is another smaller projection 33 which forms a support for an upwardly extending antenna 34. The antenna 34 is made of a length of heavy metal wire or tubing, preferably flexible, and it is fastened to the housing 17 by means of an adhesive plastic 35 that is filled in around the end of the antenna 34 in the recess formed by the smaller projection 33. The antenna 34 is utilized as both a tuned-loaded receiving and transmitting antenna, and attached to its end is a plastic ornament 36 that also serves to render its sharp end harmless.

Other novel features of my microphone-receiver-antenna unit 11 including the installation details of its various electronics elements will now be discussed with reference to FIG. 4. As stated above, the transceiver unit 14 may be any low-power transistorized unit that is suitable for voice communication. Such units are commercially available and their external controls include an on-off power and volume control 37 and a switch 38 for transmitting and receiving. Extending from the transceiver unit is the conduit 13 comprising two wires 13*a* and 13*b* which are approximately two feet in length and which are covered by a flexible plastic sheathing 39 along their length for protection. At their upper ends, the wires 13*a* and 13*b* are attached on the inner side of the stabilizing member 21 of the housing 17. To make this connection strong and permanent, I prefer to attach these wires by embedding them in a quantity of plastic cement 40 which bonds them both, including the sheathing 39, directly to the inner wall of the housing 17. The free ends of the lines 13*a* and 13*b* extend through the plastic bonding material 40 and into the recess of the projection housing 19. The line 13*a* comprises a co-ax feed line for the receiver phase of the transceiver 14 and is attached to a contact 41 on a slug-tuned antenna loading coil 42 that is fixed to the inner wall of the housing 17 by a quantity of plastic bonding material 43. The loading coil 42 is a standard component comprising a plastic cylinder to which is attached a coil of copper wire 44. One end of the coil 44 is connected to the terminal 41 and to the co-ax feed line 13*a*, while the other end is connected to the lower end of the antenna 34 at a contact 45 on the loading coil 42 within the housing 17. A permeable metal core (not shown) is movable within the loading coil 42 to provide a means for tuning the antenna 34.

The other line 13*b* from the transceiver 14 is a shielded feed line for the speaker-microphone component 31 and is attached thereto at the terminals 46 and 47. The speaker-microphone 31 may be any suitable type such as the conventional dynamic moving coil type and it is fixed within the housing 17 and against the inner side of the circular flange 29 thereof by the adhesive bonding material described previously. Other suitable means for securing the speaker-microphone 31 and the other components within the housing 17 could be used if desired with the scope of the invention.

The aforementioned components of the speaker-microphone unit 11 when secured in place as described are well within the recessed cavity formed by the housing projection 18. To seal the unit to prevent damage to the components and to provide a resilient form-fitting cushion for the housing when it is worn by an operator, I attach thereto a layer 48 of styro-foam material. This cushion 48 is bonded along its edges to the base portion 18 of the housing 17 and completely seals the speaker-microphone components 42 and 31 within the projection 19.

In operation, my novel voice communication device 10 can be quickly attached to an operator. The transceiver unit 14 is conveniently clipped to his belt 16 or in a large pocket and the novel microphone-speaker unit 11 is placed on the operator's shoulder with the elastic band 22 being adapted to fit under his arm-pit. The curved stabilizing members 20 and 21 of the housing base portion 18 serve to secure the microphone-speaker unit 11 so that it will not roll forwards or backwards but will remain in its proper position despite the constant activity of the wearer. When the unit 11 is attached the projection 19 being pre-tilted in the two directions, automatically orients the speaker-microphone 31 in its proper position so that it can easily pick up the normal tone of voice with only a relatively small amount of head movement by the wearer.

From the foregoing it is apparent that the present invention can be applied to solve a large number of communication problems where it is essential that the operator employing the communication facility be completely free from irritating and distracting encumbrances and thus able to carry on normal physical activity.

To those skilled in the art to which this invention relates, many changes in construction and many widely differing embodiments and applications of the invention may suggest themselves without departing from the spirit and scope of the invention. The disclosures and the description herein are purely illustrative and are not intended to be in any sense limiting.

I claim:

1. A portable voice communication device comprising: a transceiver having a power supply; a speaker-microphone-antenna unit, said unit including a speaker-microphone, an antenna, and a one piece housing having a generally concave base portion with downwardly extending stabilizing side members and an upwardly extending projection, said projection having a frusto-conical shape with an end opening, said speaker-microphone being fixed within said projection adjacent said end opening, said antenna extending upward through said housing; means for electrically connecting said transceiver to said speaker-microphone and said antenna; and means attached to said base portion of said housing for retaining said speaker-microphone-antenna unit in a fixed position on a person's shoulder.

2. A portable voice communication device comprising: a transceiver having a power supply; a speaker-microphone-antenna unit, said unit including a speaker-microphone, an antenna, and a one-piece molded plastic housing having a generally concave base portion with downwardly extending stabilizing side members, a laterally extending stabilizing member, and an upwardly extending projection, said projection having a frusto-conical shape with an end opening and forming a recess above the contour line of said base portion, said speaker-microphone being fixed within said projection adjacent said end opening, said antenna extending upward through said housing; means for electrically connecting said transceiver to said speaker-microphone and said antenna; and means attached to said base portion of said housing for retaining said speaker-microphone-antenna unit in a fixed position on a person's shoulder.

3. A portable voice communication device comprising: a transceiver having a power supply; a speaker-microphone-antenna unit, said unit including a speaker-microphone, an antenna, and a one-piece plastic housing having a curved base portion with a generally concave cross section forming downwardly extending stabilizing side members, a laterally extending central stabilizing member between said side members, and an integral frusto-conical projection extending above said base portion, said projection having a substantially flat upper end with an opening therein, said upper end and its opening lying in a plane that is tilted forwardly with respect to a line bisecting said base portion through its center of curvature and laterally toward said central member with respect to said base portion, said speaker-microphone being fixed within said projection adjacent said end opening, said antenna being supported by and extending upward through said housing; means for electrically connecting said transceiver to said speaker-microphone and said antenna; and means attached to said base portion of said housing for retaining said speaker-microphone-antenna unit in a fixed position on a person's shoulder.

4. A portable voice communication device comprising: a transceiver having a power supply; a speaker-microphone-antenna unit, said unit including a speaker-microphone, an antenna, and a one-piece housing having a concave base portion whose cross section has a generally constant curvature and downwardly extending stabilizing side members; an integral frusto-conical upwardly extending projection on said base portion including a smaller protuberance adjacent thereto; said projection having an upper end and an opening therein; means for retaining said speaker-microphone within said projection adjacent said end opening; means for rigidly retaining the lower end of said antenna within a recess formed by said protuberance, said antenna being thereby supported by and extending upward through said housing; means for electrically connecting said transceiver to said speaker-microphone and to said antenna; and means attached to said base portion of said housing for retaining said speaker-microphone-antenna unit in a fixed position on the shoulder of a person using said voice communication device.

5. In a portable voice communication device including a transceiver unit having a power supply and a speaker-microphone-antenna unit connected thereto by electrical conduits of a predetermined length, a contoured housing for said speaker-microphone-antenna unit comprising a curved base portion adapted to fit over an individual's shoulder and an upwardly extending projection thereon forming a cavity above the inner concave surface of said base portion; a speaker-microphone component fixed within said cavity; a tuning coil attached to the inner surface of said housing within said cavity; an antenna attached to said housing having an upper end extending outside of said housing and having a lower end extending within said cavity and connected to said tuning coil; said speaker-microphone component and said tuning coil being located completely within the inner contour of said housing base portion, and means for retaining said housing on an individual's shoulder during the use of said communication device, whereby the individual's hands are left free and the individual's head is unencumbered by any portion of the communication device.

6. The device as described in claim 5 wherein said upwardly extending projection has a generally frusto-conical shape with the plane of its end being tilted both forward and to one side with respect to said base portion whereby the speaker-microphone is automatically oriented in the proper position with respect to the wearer's head when attached to his shoulder.

7. In a portable voice communication device including a transceiver unit having a power supply and a speaker-microphone-antenna unit electrically connected thereto, a contoured housing for said speaker-microphone-antenna unit comprising a curved base portion having downwardly extending stabilizing members and a central laterally extending member and being thereby adapted to fit over an individual's shoulder and an integral upwardly extending projection on said base portion forming a cavity above the inner concave surface of said base portion; a speaker-microphone component fixed within said cavity; an antenna tuning coil attached to the inner surface of said housing within said cavity; an antenna attached to said housing having an upper end extending outside of said housing and having a lower end extending within said cavity and connected to said tuning coil; said speaker-microphone component and said tuning coil being located completely within the inner contour of said housing base portion; conduit means extending from said transceiver unit and connected to said speaker-microphone and said antenna tuning coil; and means for retaining said housing on an individual's shoulder during the use of said communication device, whereby the individual's hands are left free to manipulate and the individual's head is unencumbered by any portion of the communication device.

8. The device described in claim 7 wherein said speaker-microphone component, said antenna tuning coil, and an end portion of said conduit means are rigidly secured by plastic material to the inner surface of said contoured housing.

9. A one-piece molded plastic housing unit for use in a portable voice communication system comprising: a generally annular base portion having a concave cross section, downwardly extending stabilizing side members, and a laterally extending central stabilizing member between said side members; an upwardly extending frustoconical projection integral with said base portion and having an end opening, said projection providing a recess above the curved contour of said base portion for enclosing and supporting radio components of said system including an antenna; and elastic band means connected to said stabilizing side members for retaining said housing on an individual's shoulder during the use of said communication system, whereby the individual's hands are left free and the individual's head is unencumbered by any portion of the communication system.

References Cited in the file of this patent

UNITED STATES PATENTS 2,541,042 Curtis ---------------- Feb. 13, 1951